(12) United States Patent
Yamamoto

(10) Patent No.: US 10,288,171 B2
(45) Date of Patent: May 14, 2019

(54) MOTOR CONTROLLER

(71) Applicant: DENSO CORPORATION, Kariya, Aichi-pref. (JP)

(72) Inventor: Daisuke Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 145 days.

(21) Appl. No.: 15/433,207

(22) Filed: Feb. 15, 2017

(65) Prior Publication Data

US 2017/0234424 A1 Aug. 17, 2017

(30) Foreign Application Priority Data

Feb. 16, 2016 (JP) .................................. 2016-27050

(51) Int. Cl.

| F16H 61/32 | (2006.01) |
|---|---|
| G05D 3/20 | (2006.01) |
| H02P 7/28 | (2016.01) |
| H02P 29/60 | (2016.01) |
| F16H 59/72 | (2006.01) |
| F16H 61/28 | (2006.01) |

(52) U.S. Cl.
CPC ............... *F16H 61/32* (2013.01); *G05D 3/20* (2013.01); *H02P 7/28* (2013.01); *H02P 29/60* (2016.02); *F16H 59/72* (2013.01); *F16H 2061/283* (2013.01); *F16H 2061/326* (2013.01)

(58) Field of Classification Search
CPC .... F16H 59/72; F16H 61/32; F16H 2061/283; F16H 2061/326
See application file for complete search history.

(56) References Cited

U.S. PATENT DOCUMENTS

| 4,509,124 | A * | 4/1985 | Suzuki | F16H 45/02 192/3.28 |
|---|---|---|---|---|
| 7,040,187 | B2 * | 5/2006 | Amamiya | F16H 61/32 192/218 |
| 7,084,597 | B2 * | 8/2006 | Nakai | F16H 61/32 318/254.1 |
| 7,221,116 | B2 * | 5/2007 | Nakai | F16H 61/32 318/266 |
| 7,382,107 | B2 * | 6/2008 | Hori | F16H 61/32 318/432 |
| 7,567,051 | B2 * | 7/2009 | Hori | F16H 61/32 318/432 |

(Continued)

*Primary Examiner* — David R Morris
(74) *Attorney, Agent, or Firm* — Nixon & Vanderhye P.C.

(57) ABSTRACT

When a butting control is performed at a low temperature at which an oil temperature of an automatic transmission is equal to or lower than a predetermined value, a driving condition changing process is performed. In the driving condition changing process, an execution period from a starting of the butting control to an ending of the butting control is divided into a plurality of sections on the basis of a rotation angle of a motor. By making a torque of the motor greater and a rotation speed higher in a starting-section than in an ending-section, the execution period of the butting control is made short. By making the torque of the motor smaller and the rotation speed lower in the ending-section than in the starting-section, an amount of deformation of a component is made smaller when a part of a component is butted against a limit position so that a reference position can be learned accurately.

3 Claims, 7 Drawing Sheets

(56) References Cited

U.S. PATENT DOCUMENTS

| | | | |
|---|---|---|---|
| 7,572,203 B2* | 8/2009 | Kashiwagi | F16H 61/12 477/34 |
| 7,609,012 B2* | 10/2009 | Kamio | F16H 61/32 318/266 |
| 7,874,225 B2* | 1/2011 | Kamada | F16H 61/32 74/335 |
| 7,990,088 B2* | 8/2011 | Isobe | F16H 61/32 318/400.11 |
| 8,013,563 B2* | 9/2011 | Nakai | F16H 61/32 318/437 |
| 8,068,965 B2* | 11/2011 | Kubonoya | F16H 61/32 180/179 |
| 8,134,322 B2* | 3/2012 | Nakai | F16H 61/32 318/437 |
| 8,626,412 B2* | 1/2014 | Kimura | B60W 10/06 701/54 |
| 8,707,817 B2* | 4/2014 | Itazu | F16H 59/08 74/473.12 |
| 8,718,885 B2* | 5/2014 | Ueno | F16H 63/3466 701/58 |
| 8,942,898 B2* | 1/2015 | Yamada | F16H 59/105 477/34 |
| 9,037,361 B2* | 5/2015 | Vernacchia | F16H 61/2807 701/51 |
| 9,037,362 B2* | 5/2015 | Sekiya | F16H 61/32 701/51 |
| 9,136,788 B2 | 9/2015 | Okubo et al. | |
| 9,166,520 B2* | 10/2015 | Nagata | H02P 31/00 |
| 9,304,506 B2* | 4/2016 | Yoshida | F16H 61/32 |
| 9,580,051 B2* | 2/2017 | Ueno | B60R 25/06 |
| 9,951,866 B2* | 4/2018 | Kuwahara | F16H 61/24 |
| 9,970,539 B2* | 5/2018 | Sakaguchi | F16H 59/105 |
| 2003/0222617 A1 | 12/2003 | Nakai et al. | |
| 2004/0200683 A1* | 10/2004 | Amamiya | F16H 61/32 192/3.58 |
| 2006/0033464 A1 | 2/2006 | Nakai et al. | |
| 2006/0197489 A1 | 9/2006 | Nakai et al. | |
| 2006/0276300 A1* | 12/2006 | Kashiwagi | F16H 61/12 477/34 |
| 2007/0046243 A1* | 3/2007 | Hori | F16H 61/32 318/630 |
| 2007/0182353 A1 | 8/2007 | Kamio et al. | |
| 2008/0001568 A1* | 1/2008 | Hori | F16H 61/32 318/652 |
| 2008/0103665 A1* | 5/2008 | Kubonoya | F16H 61/32 701/59 |
| 2008/0108480 A1* | 5/2008 | Kamada | F16H 61/32 477/115 |
| 2008/0129236 A1* | 6/2008 | Isobe | F16H 61/32 318/468 |
| 2009/0108791 A1* | 4/2009 | Isobe | F16H 61/32 318/561 |
| 2009/0193923 A1 | 8/2009 | Nakai et al. | |
| 2010/0294066 A1* | 11/2010 | Itazu | F16H 59/08 74/473.12 |
| 2011/0056226 A1 | 3/2011 | Okubo et al. | |
| 2011/0068730 A1 | 3/2011 | Nakai et al. | |
| 2011/0112732 A1* | 5/2011 | Ueno | B60R 25/06 701/51 |
| 2011/0246033 A1* | 10/2011 | Vernacchia | F16H 61/2807 701/51 |
| 2012/0010793 A1* | 1/2012 | Ueno | F16H 63/3466 701/58 |
| 2012/0123653 A1* | 5/2012 | Kimura | B60W 10/06 701/54 |
| 2013/0024079 A1* | 1/2013 | Sekiya | F16H 61/32 701/51 |
| 2014/0025266 A1* | 1/2014 | Yamada | F16H 59/105 701/51 |
| 2014/0139171 A1* | 5/2014 | Yoshida | F16H 61/32 318/603 |
| 2014/0210395 A1* | 7/2014 | Nagata | H02P 31/00 318/671 |
| 2016/0102761 A1* | 4/2016 | Kuwahara | F16H 61/24 74/473.12 |
| 2017/0234423 A1* | 8/2017 | Sakaguchi | F16H 59/105 701/59 |
| 2017/0307074 A1* | 10/2017 | Yamada | F16H 61/12 |

* cited by examiner

MOTOR CONTROLLER

CROSS REFERENCE TO RELATED APPLICATION

This application is based on Japanese Patent Application No. 2016-27050 filed on Feb. 16, 2016, the disclosure of which is incorporated herein by reference.

TECHNICAL FIELD

The present disclosure relates to a motor controller that controls a motor which functions as a driving source for a control target.

BACKGROUND

Also in automobiles, in order to meet the demand for space-saving, improving assemblability, improving controllability, and the like, there is a trend that a mechanical driving system is replaced by a system which is electrically driven by a motor. As an example of the system, there is an automatic transmission for vehicle in which a range-changing mechanism is driven by a motor as described in JP 2004-23932 A. On this range-changing mechanism, there is mounted an encoder which outputs a pulse signal every predetermined angles in synchronism with rotation of a motor, and energization phases of the motor are sequentially changed based on a count value of the output signal of the encoder so that the motor is rotationally driven to a target position.

In a system as described above, in order to learn a reference position for controlling a rotational position of the motor, a butting control is performed in which the motor is rotated until butting to a limit position (for example, a wall) of a movable range of the range-changing mechanism. Thus, the reference position is learned.

However, if a motor torque is made larger and the rotation speed is made higher at the time of the butting control, an amount of deformation (for example, deflection amount) of a component becomes large when a part of a component is butted against the limit position of the movable range of the range-changing mechanism, so that the learning accuracy of the reference position may be deteriorated.

JP 2004-23932 A describes a method in which the motor torque and the rotation speed are reduced at the time of the butting control. This method makes it possible to reduce the deformation amount of the component at the time of butting the limit position of the movable range of the range-changing mechanism.

However, if the motor torque and the rotation speed are reduced in a period from a start to an end of the butting control, it takes a longer time from the start of the butting control to the butting against the limit position, and an execution period (time from the start to the end of the butting control) of the butting control is thus increased. In particular, at a low temperature, a viscosity of lubricant on a movable part of the range-changing mechanism is higher, and the friction resistance is accordingly higher. Therefore, if the motor torque is small, the rotation speed is accordingly lower, whereby the execution period of the butting control can be considerably long.

SUMMARY

It is an object of the present disclosure to provide a motor controller which can reduce the execution period of the butting control in a system in which the butting control is performed to learn the reference position, and at the same time, the learning accuracy of the reference position at a low temperature is secured.

According to an aspect of the present disclosure, a motor controller includes: a motor that functions as a driving source for a control target; an encoder that outputs a pulse signal in synchronism with rotation of the motor; and a controlling unit that rotationally drives the motor to a target position by sequentially changing energization phases of the motor, based on a count value of the output signal of the encoder. The controlling unit learns a reference position by executing a butting control in which the motor is rotationally driven until butting the limit position of a movable range of the control target. Further, the motor controller includes: a temperature information obtaining unit that obtains a temperature of the control target or a temperature in correlation with the temperature of the control target (hereinafter, the temperature is collectively referred to as "temperature information"); and a changing unit that performs a driving condition changing process when the butting control is performed at a low temperature at which the temperature information is not greater than a predetermined value. An execution range from a starting of the butting control to an ending of the butting control is divided into a plurality of sections on the basis of a rotation angle of the motor. In the driving condition changing process, a torque of the motor is made greater and a rotation speed is made higher in a starting-section of the plurality of sections than in an ending-section of the plurality of sections, and the torque of the motor is made smaller and the rotation speed is made lower in the ending-section than in the starting-section.

In this configuration, when the butting control is performed at a low temperature, the motor torque can be made greater and the rotation speed can be made higher in the starting-section. Thus, the execution period of the butting control (the time period from the starting of the butting control to the ending of the butting control) can be shorter compared with the case that the motor torque is made smaller and the rotation speed is made lower in the execution period from a starting of the butting control to an ending of the butting control. Then, the motor torque can be made smaller and the rotation speed can be made lower in the ending-section. Thus, an amount of deformation (for example, a deflection amount) of a component can be small when a part of a component is butted against the limit position of the movable range of the control target, and it is possible to learn the reference position accurately. With this arrangement, it is possible to reduce the execution period of the butting control while securing the learning accuracy of the reference position at a low temperature.

BRIEF DESCRIPTION OF THE DRAWINGS

The above object, other objects, features, and advantages of the present disclosure will be more apparent by the following detailed description with reference to the accompanying drawings.

DETAILED DESCRIPTION

Hereinafter, a description will be given on an embodiment in which a configuration for practicing the present disclosure is embodied.

A configuration of a range-changing control system will be described with reference to FIG. 1 and FIG. 2.

Figure 1:
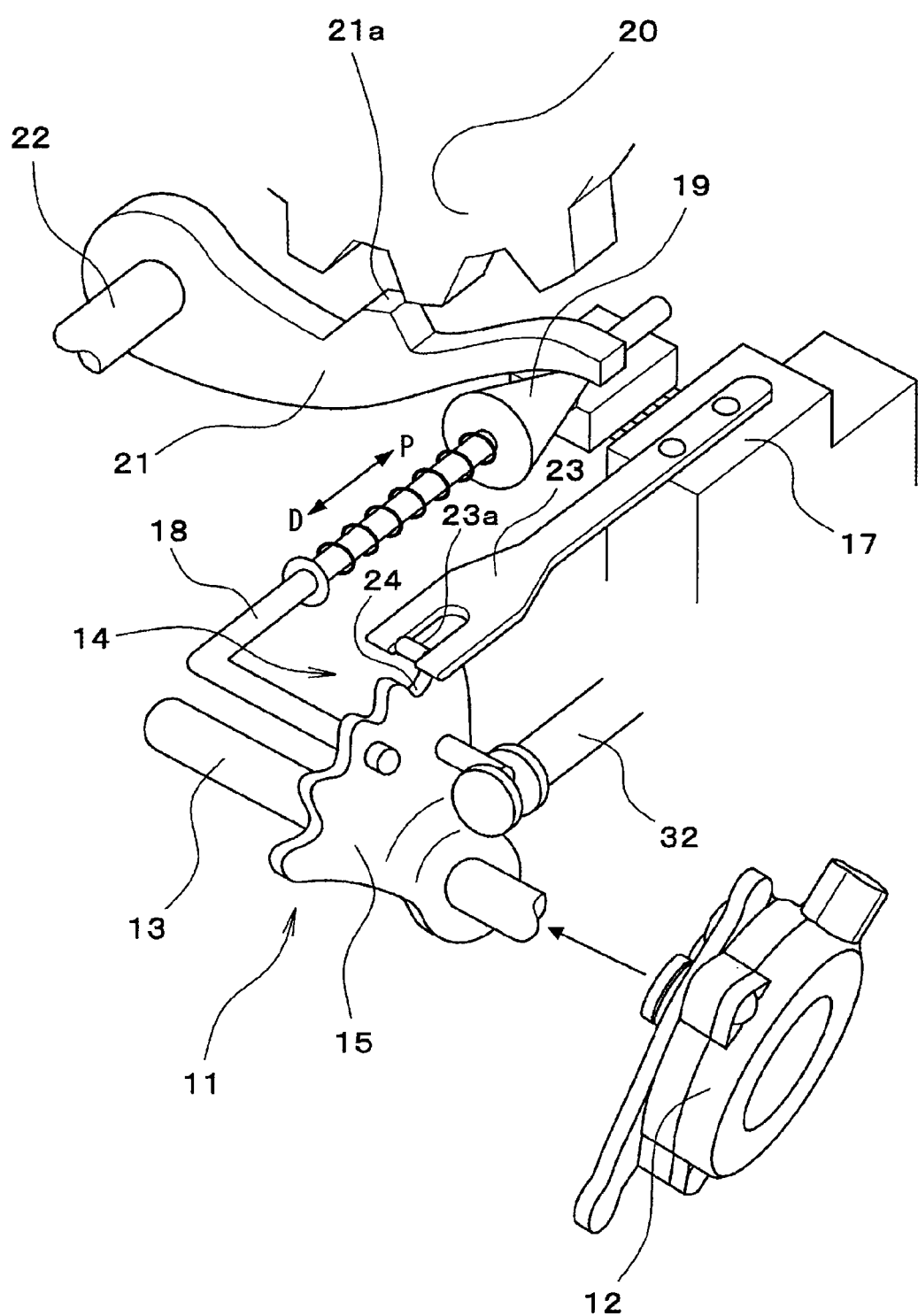
FIG. 1 is a perspective view of a range-changing mechanism in an embodiment of the present disclosure.
Figure 2:
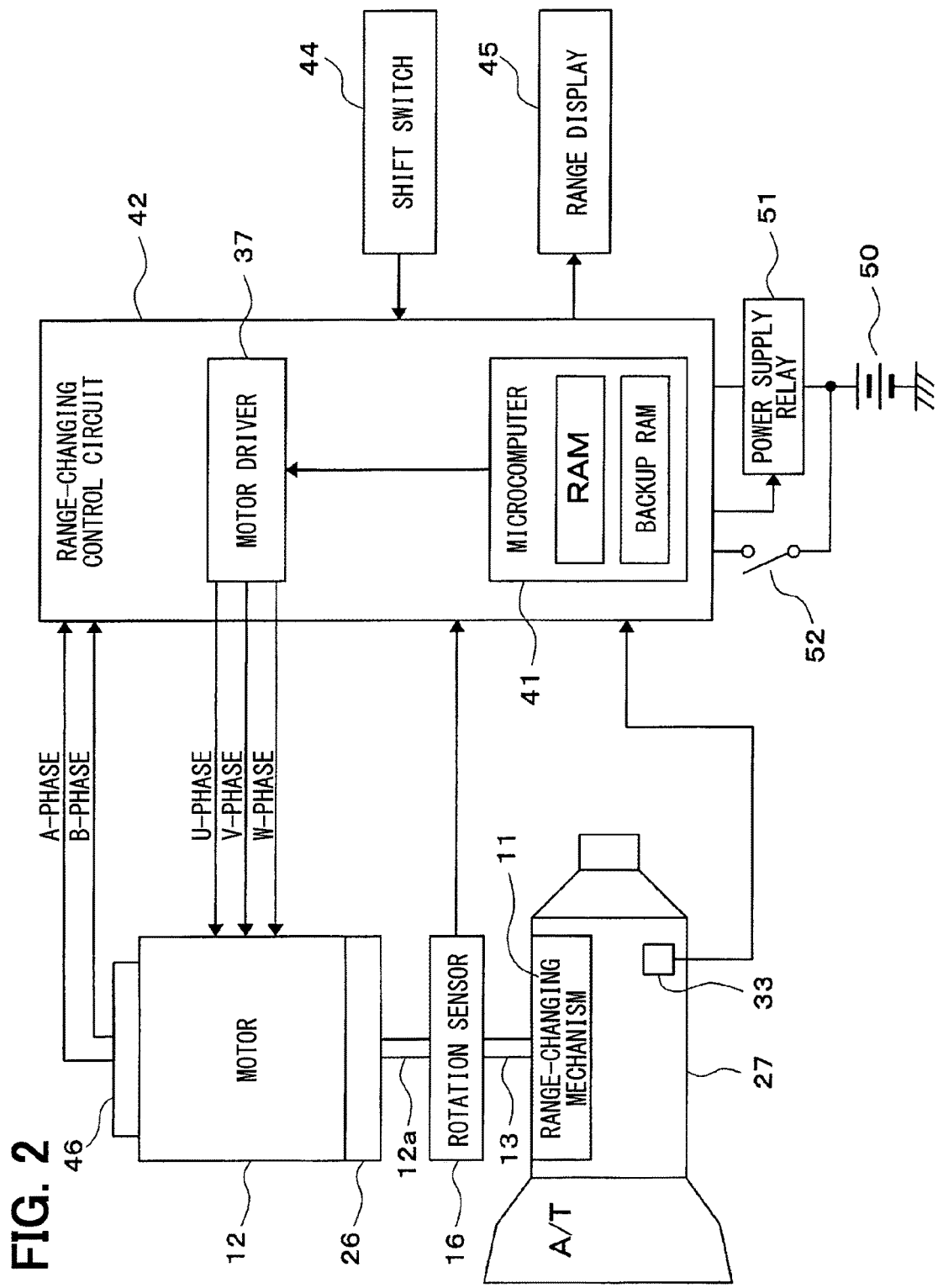
FIG. 2 is a diagram showing a schematic configuration of a range-changing control system.

As shown in FIG. 1 and FIG. 2, a range-changing mechanism 11 is a four-position range-changing mechanism in which a shift range of an automatic transmission 27 mounted on a vehicle is changed among P-range, R-range, N-range, and D-range. P-range means a parking range. R-range means a reverse range. N-range means a neutral range. D-range means a drive range. The range-changing mechanism 11 corresponds to a control target. A motor 12 functioning as a driving source for the range-changing mechanism 11 is configured with a switched reluctance motor, for example. The motor 12 has a speed reduction mechanism 26. An output shaft 12a of the motor 12 is connected to a manual shaft 13 of the range-changing mechanism 11.

As shown in FIG. 1, a detent lever 15 is fixed to the manual shaft 13. A manual bulb 32 is engaged with the detent lever 15. The manual bulb 32 performs linear motion, depending on rotation of the detent lever 15. The manual bulb 32 changes a hydraulic circuit (not shown) inside the automatic transmission 27 so that the shift range is changed.

An L-shaped parking rod 18 is fixed to the detent lever 15. A conical body 19 is provided on the end part of the parking rod 18 and is in contact with a lock lever 21. The lock lever 21 moves vertically centering on a shaft 22, depending on the position of a conical body 19, so as to lock/unlock a parking gear 20. The parking gear 20 is provided on an output shaft of the automatic transmission 27. When the parking gear 20 is locked by the lock lever 21, drive wheels of the vehicle are kept in a state of rotation stop (parking state).

On the other hand, a detent spring 23 is fixed to a support base 17 to keep the detent lever 15 in each range of P, R, N, and D. The detent lever 15 has range holding recesses 24 for each range of P, R, N, and D. When an engagement part 23a provided on the end of the detent spring 23 is fit in each of the range holding recesses 24 of the detent lever 15, the detent lever 15 is held at the position of each range. The detent lever 15, the detent spring 23, and the like constitute a detent mechanism 14 to engage and hold the rotational position of the detent lever 15 at the position of each range (to hold the range-changing mechanism 11 at the position of each range).

In P-range, the parking rod 18 moves in a direction to get closer to the lock lever 21, so that the thicker part of the conical body 19 pushes up the lock lever 21. By this movement, a projecting portion 21a of the lock lever 21 is fit in the parking gear 20, and the parking gear 20 gets locked. Thus, the output shaft of the automatic transmission 27 is kept in a state of being locked (parking state).

On the other hand, in the ranges other than P-range, the parking rod 18 is moved in the direction to depart from the lock lever 21, so that the thick part of the conical body 19 gets out from the lock lever 21, whereby the lock lever 21 goes down. This movement releases the projecting portion 21a of the lock lever 21 from the parking gear 20, and the parking gear 20 is thus unlocked. Thus, the output shaft of the automatic transmission 27 is held in a rotatable state (drivable state).

As shown in FIG. 2, the automatic transmission 27 is provided with an oil temperature sensor 33 for detecting an oil temperature (temperature of hydraulic oil). The oil temperature of the automatic transmission 27 is in correlation with the temperature of the range-changing mechanism 11 and is thus used as information of the temperature of the range-changing mechanism 11. The oil temperature sensor 33 corresponds to a temperature information obtaining unit.

As shown in FIG. 2, the manual shaft 13 of the range-changing mechanism 11 is provided with a rotation sensor 16 for detecting a rotation angle (rotational position) of the manual shaft 13. The rotation sensor 16 is configured with a sensor (for example, potentiometer) that outputs a voltage depending on the rotation angle of the manual shaft 13. Based on the output voltage of the rotation sensor 16, it is possible to confirm which range the shift range is in, P-range, R-range, N-range, or D-range.

Further, the motor 12 is provided with an encoder 46 for detecting the rotation angle (rotational position) of a rotor. The encoder 46 is configured with, for example, a magnetic rotary encoder. The encoder 46 outputs pulse signals in A-phase and B-phase every predetermined angle, in synchronism with the rotation of the rotor of the motor 12. A microcomputer 41 of a range-changing control circuit 42 counts both of a rising edge and a falling edge of an A-phase signal and a B-phase signal being output from the encoder 46. The microcomputer 41 rotationally drives the motor 12 by causing a motor driver 37 to change energization phases of the motor 12 in a predetermined order, depending on the count value of the encoder 46 (hereinafter, referred to as an "encoder count value"). Note that it is also possible to provide two systems of the combination of three-phase (U-phase, V-phase, and W-phase) winding wires of the motor 12 and the motor driver 37 so that even if one of the systems breaks down, the other system can rotationally drive the motor 12.

While the motor 12 is rotating, the microcomputer 41 determines the rotational direction of the motor 12, based on a generation order of the A-phase signal and the B-phase signal. When the rotation is forward (for example, the rotational direction from P-range to D-range), the microcomputer 41 counts up the encoder count value. When the rotation is reverse (for example, the rotational direction from D-range to P-range), the microcomputer 41 counts down the encoder count value. This arrangement maintains the correspondence relationship between encoder count value and the rotation angle of the motor 12 when the motor 12 rotates in any direction—forward or reverse. Thus, in any rotational direction—forward or reverse, the rotational position of the motor 12 is detected based on the encoder count value, and the winding wire in the phase corresponding to the rotational position can be energized to rotationally drive the motor 12.

The range-changing control circuit 42 is fed with a signal of a shift lever operation position detected by a shift switch 44. The microcomputer 41 of the range-changing control circuit 42 changes a target range (target shift range) in correspondence to a shift lever operation of a driver or the like, and rotationally drives the motor 12 in correspondence to the target range, thereby changing the shift range. Further, the microcomputer 41 displays the actual shift range after being changed, on a range display 45 provided in an instrument panel (not shown).

Further, the range-changing control circuit 42 is supplied with a power supply voltage from a battery (power source) 50 mounted on the vehicle through a power supply relay 51. The power supply relay 51 is turned on and off by manually turning on and off an ignition switch (IG switch) 52 as a power switch. When the IG switch 52 is turned on, the power supply relay 51 is turned on, and the range-changing control circuit 42 is thus supplied with the power supply voltage. When the IG switch 52 is turned off, the power supply relay 51 is turned off, and the supply of power to the range-changing control circuit 42 is terminated.

Since the encoder count value is stored in a RAM of the microcomputer 41, when the power supply for the range-changing control circuit 42 is turned off, the stored value of the encoder count value disappear. Thus, the encoder count value immediately after the range-changing control circuit 42 is powered on does not correspond to the actual rotational position or the energization phases of the motor 12. Therefore, in order to change the energization phases on the basis of the encoder count value, it is necessary to make the encoder count value correspond to the actual rotational position of the motor 12 after turning on the power so that the encoder count value corresponds to the energization phases.

The microcomputer 41 performs an initial drive after turning on the power to learn the correspondence relationship between the energization phases of the motor 12 and the encoder count value. In the initial drive, by changing the energization phases of the motor 12, by an open loop control, in a round according to a predetermined time schedule, the motor 12 is rotationally driven while the rotational position of the motor 12 and the energization phase is matched in any one of the energization phases; and the edges of the A-phase signal and the B-phase signal of the encoder 46 are counted. Then, the microcomputer 41 learns the correspondence relationship among the encoder count value when the initial drive is completed, the rotational position of the motor 12, and the energization phases.

The microcomputer 41 can detect only the rotation amount (rotation angle) from a start-up position, based on the encoder count value of the motor 12 after the start-up of the motor 12. For this reason, unless an absolute rotational position of the motor 12 is detected in some way, it is impossible to rotationally drive the motor 12 correctly to a target rotational position.

After the completion of the initial drive, the microcomputer 41 performs a butting control in which the motor 12 is rotated until the engagement part 23a of the detent spring 23 is butted against a limit position of the movable range of the range-changing mechanism 11, and the microcomputer 41 learns the limit position as a reference position. Then, the rotation amount (rotation angle) of the motor 12 is controlled by using the encoder count value of the reference position as a reference.

Specifically, a "P-range wall butting control" is performed in which the motor 12 is rotated until the engagement part 23a of the detent spring 23 is butted against a P-range wall (a side wall of a P-range holding recess 24), which is the limit position on the P-range side of the movable range of the range-changing mechanism 11. Thus, the limit position on the P-range side is learned as a reference position of the P-range side. Alternatively, a "D-range wall butting control" is performed in which the motor 12 is rotated until the engagement part 23a of the detent spring 23 is butted against a D-range wall (the side wall of a D-range holding recess 25), which is the limit position on the D-range side (the opposite side from P-range) of the movable range of the range-changing mechanism 11. Thus, the limit position on the D-range side is learned as the reference position of the D-range side.

After learning the reference position, when the target range is changed by a shift lever operation or the like of a driver, the microcomputer 41 changes the target rotational position (target count value), depending on the target range. Then, the microcomputer 41 performs a feedback control in which the microcomputer 41 sequentially changes the energization phases of the motor 12 on the basis of the encoder count value so that the motor 12 is rotationally driven to the target rotational position corresponding to the target range. By this operation, the shift range is changed to the target range (a change position of the range-changing mechanism 11 is changed to the position of the target range). The microcomputer 41 plays a role of a controlling unit.

When a torque of the motor 12 is made large and the rotation speed is made high at a time of the butting control, a deformation amount of a component (for example, a deflection amount of the detent spring 23) increases when the engagement part 23a of the detent spring 23 is butted against the limit position of the movable range of the range-changing mechanism 11, whereby the learning accuracy of the reference position may be deteriorated.

On the other hand, when the torque of the motor 12 is made small and the rotation speed is made low at a time of the butting control, the deformation amount of the component can be small when the engagement part 23a of the detent spring 23 is butted against the limit position of the movable range of the range-changing mechanism 11, whereby it is possible to learn the reference position accurately.

However, when the torque of the motor 12 is made small and the rotation speed is made low from a starting of the butting control to an ending of the butting control, the time period from when the butting control is started to when the limit position is butted is longer. The execution period of the butting control will be longer. In particular, at a low temperature, the viscosity of lubricant on a movable part of the range-changing mechanism 11 is higher, and friction resistance thus increases. Therefore, when the torque of the motor 12 is small, the rotation speed is accordingly lower, thereby making the execution period of the butting control considerably long.

In the present embodiment, the microcomputer 41 of the range-changing control circuit 42 executes a drive condition changing routine of FIG. 4, which will be described later. A driving condition changing process is performed in the case that the butting control (for example, the P-range wall butting control or the D-range wall butting control) is performed at a low temperature at which the oil temperature (the temperature in correlation with the temperature of the range-changing mechanism 11) of the automatic transmission 27 detected by the oil temperature sensor 33 is equal to or lower than a predetermined value. In the driving condition changing process, the execution period from a starting of the butting control to an ending of the butting control is divided into two sections (for example, a starting-section and an ending-section) on the basis of the rotation angle of the motor 12. Further, in the starting-section, the torque of the motor 12 is made greater and the rotation speed is made higher than in the ending-section. In the ending-section, the torque of the motor 12 is made smaller and the rotation speed is made lower than in the starting-section.

Specifically, the angle obtained by subtracting a predetermined angle from a design value of the rotation angle of the motor 12 during the butting control is set as a changeover angle. The range from when the butting control is started to when the rotation angle of the motor 12 reaches the change-over angle is the starting-section, and the range from when the rotation angle of the motor 12 reaches the change-over angle to when the butting control is completed is the ending-section.

Figure 3:
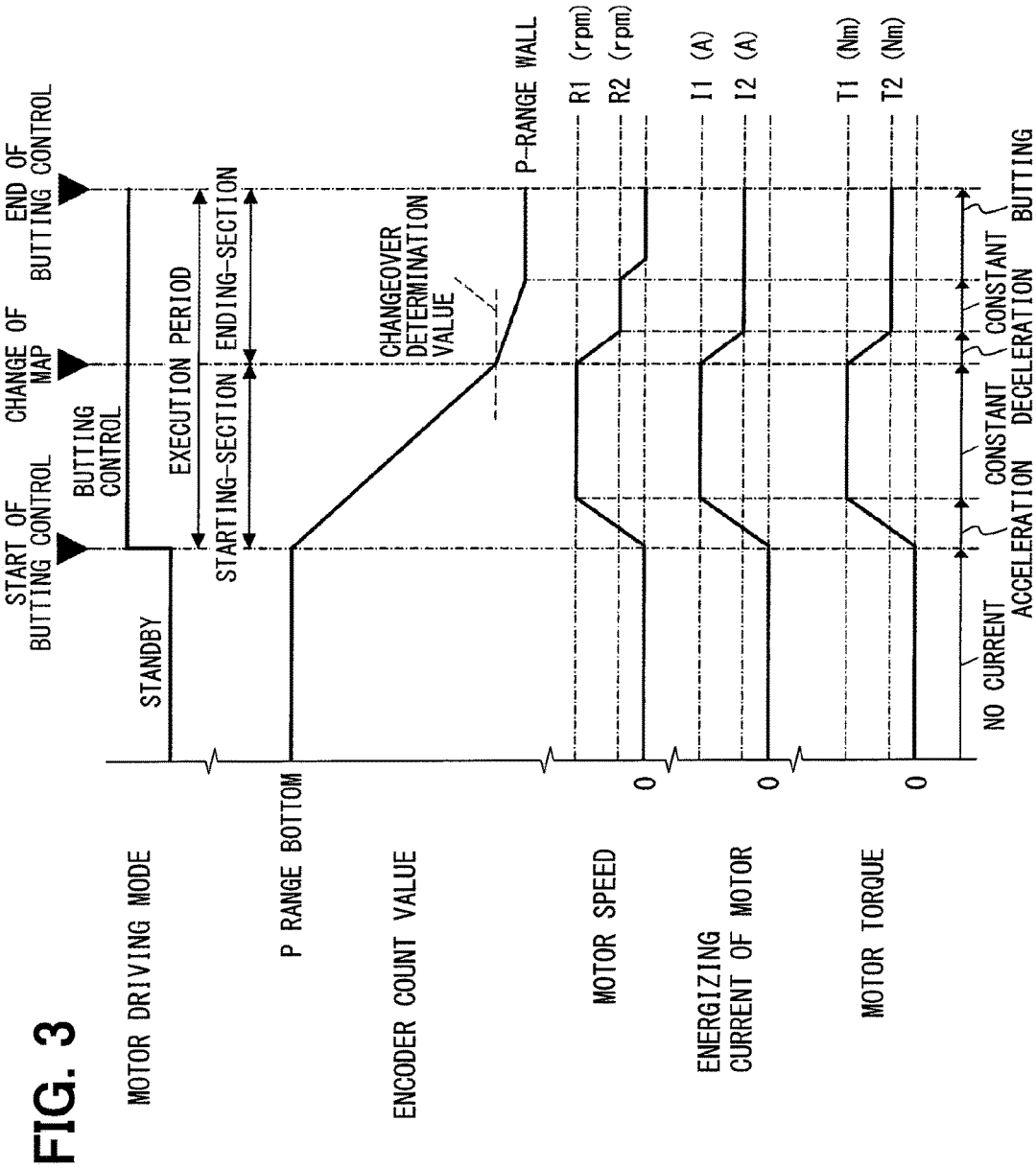
FIG. 3 is a time chart showing an execution example of a driving condition changing process.

As shown in FIG. 3, in the starting-section, by performing control such that an energizing current of the motor 12 is increased to a target current I1 and is maintained in the vicinity of the target current I1, the torque of the motor 12 is maintained up to a target torque T1 (the torque corresponding to the target current I1) and is maintained in the vicinity of the target torque T1. In this control, by setting the target current I1 for the starting-section to a value greater than a target current I2 for the ending-section, the target torque T1 for the starting-section is made greater than a target torque T2 for the ending-section. Further, a control is performed such that a rotation speed of the motor 12 is accelerated to a target rotation speed R1 and is maintained in the vicinity of the target rotation speed R1. In this control, the target rotation speed R1 for the starting-section is set to a value higher than the target rotation speed R2 for the ending-section. By this operation, in the starting-section, the torque of the motor 12 is greater and the rotation speed is higher than in the ending-section.

After that, in the ending-section, by performing a control such that the energizing current of the motor 12 is reduced to the target current I2 and is maintained in the vicinity of the target current I2, the torque of the motor 12 is reduced to the target torque T2 (the torque corresponding to the target current I2) and is maintained in the vicinity of the target torque T2. In this control, by setting the target current I2 for the ending-section to the target current I1 for the starting-section, the target torque T2 for the ending-section is made smaller than the target torque T1 for the starting-section. Further, control is performed such that the rotation speed of the motor 12 is reduced to the target rotation speed R2 and is maintained in the vicinity of the target rotation speed R2. In this control, the target rotation speed R2 for the ending-section is set to a value lower than the target rotation speed R1 for the starting-section. By this operation, the torque of the motor 12 is made smaller and the rotation speed is made lower in the ending-section than in the starting-section. In this situation, the engagement part 23a of the detent spring 23 is butted against the limit position of the movable range of the range-changing mechanism 11.

Further, in the present embodiment, the driving condition changing process is performed also when the butting control is performed at a non-low temperature at which the oil temperature of the automatic transmission 27 detected by the oil temperature sensor 33 is higher than a predetermined value. Further, in the case that the driving condition changing process is performed at a low temperature, the torque of the motor 12 is made greater than when the driving condition changing process is performed at a non-low temperature.

Hereinafter, a description will be given on a content of the process of the drive condition changing routine of FIG. 4 which is executed, in the present embodiment, by the microcomputer 41 of the range-changing control circuit 42. The drive condition changing routine of FIG. 4 uses the energization map at a low temperature shown in FIG. 5 and the energization map at a non-low temperature shown in FIG. 6. By changing the energization maps between a low temperature and a non-low temperature, the target current and the target rotation speed are changed. That is, the target current and the target rotation speed are changed depending on temperature conditions.

Figure 5:
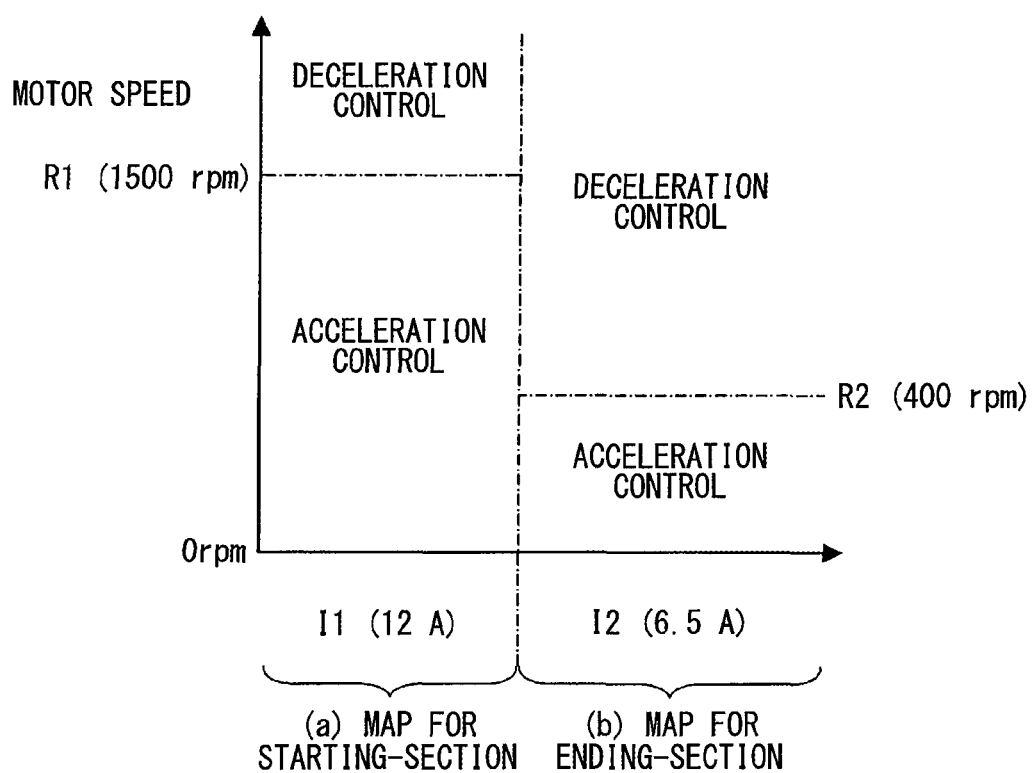
FIG. 5 is a diagram showing an example of an energization map at a low temperature.

The energization map at a low temperature shown in FIG. 5 is set separately in two parts of the energization map for the starting-section at a low temperature and the energization map for the ending-section at a low temperature. At a low temperature, by changing the energization maps between the starting-section and the ending-section, the target current and target rotation speed are changed.

On the energization map for the starting-section at a low temperature, the target current I1 for the starting-section is set to a value (for example, 12 A) greater than the target current I2 for the ending-section. The target current I1 for the starting-section at a low temperature is set to a value greater than a target current I3 for the starting-section at a non-low temperature. Further, on the energization map for the starting-section at a low temperature, the target rotation speed R1 for the starting-section is set to a value (for example, 1500 rpm) higher than the target rotation speed R2 for the ending-section. Further, an acceleration control of the motor 12 is performed in the area in which the rotation speed of the motor 12 is equal to or lower than the target rotation speed R1, and a deceleration control of the motor 12 is performed in the area in which the rotation speed of the motor 12 is higher than the target rotation speed R1. In the above, the acceleration control of the motor 12 is control in which phase advance amounts of the energization phases are corrected to accelerate the rotation speed of the motor 12. The deceleration control of the motor 12 is a control in which the phase advance amounts of the energization phases are corrected to decelerate the rotation speed of the motor 12.

On the energization map for the ending-section at a low temperature, the target current I2 for the ending-section is set to a value (for example, 6.5 A) smaller than the target current I1 for the starting-section. The target current I2 for the ending-section at a low temperature is set to a value greater than a target current I4 for the ending-section at a non-low temperature. Further, on the energization map for the ending-section at a low temperature, the target rotation speed R2 for the ending-section is set to a value (for example, 400 rpm) lower than the target rotation speed R1 for the starting-section. Further, the acceleration control of the motor 12 is performed in the area in which the rotation speed of the motor 12 is equal to or lower than the target rotation speed R2, and the deceleration control of the motor 12 is performed in the area in which the rotation speed of the motor 12 is higher than the target rotation speed R2. The target rotation speed R2 for the ending-section at a low temperature is set to a value lower than a target rotation speed R4 for the ending-section at a non-low temperature.

Figure 6:
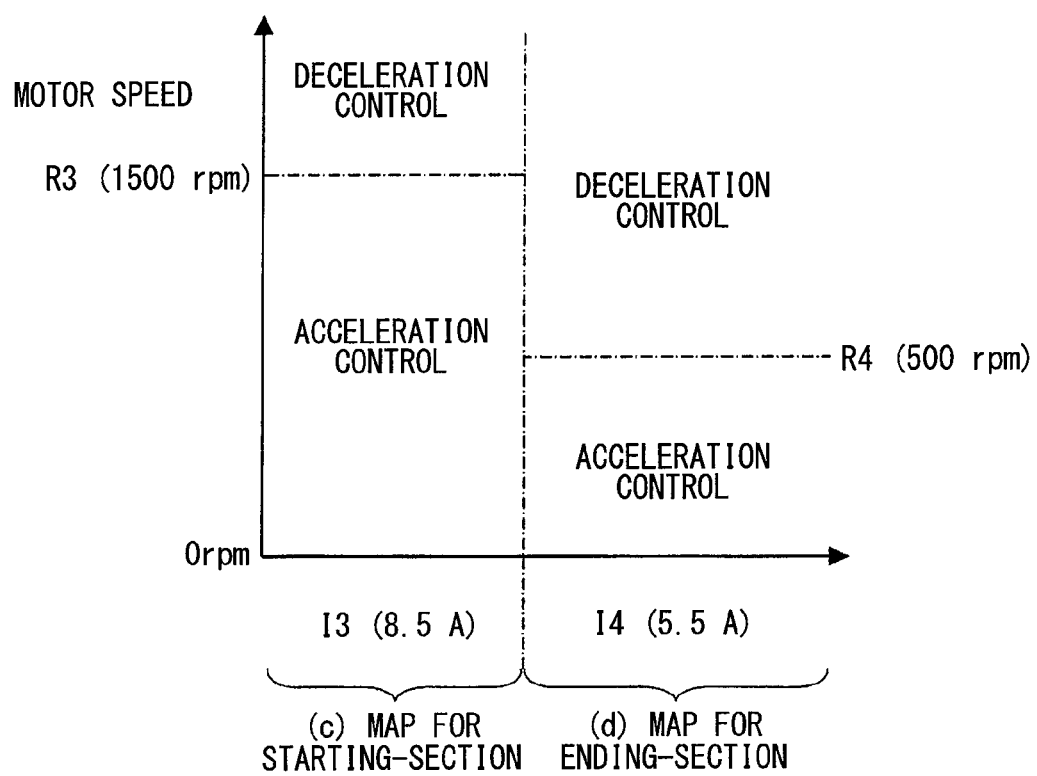
FIG. 6 is a diagram showing an example of an energization map at a non-low temperature.

The energization map at a non-low temperature shown in FIG. 6 is set separately in two parts of the energization map for the starting-section at a non-low temperature and the energization map for the ending-section at a non-low temperature. At a non-low temperature, by changing the energization maps between the starting-section and the ending-section, the target current and target rotation speed are changed.

In the energization map for the starting-section at a non-low temperature, the target current I3 for the starting-section is set to a value (for example, 8.5 A) greater than the target current I4 for the ending-section. The target current I3 for the starting-section at a non-low temperature is set to a value smaller than the target current I1 for the starting-section at a low temperature. Further, on the energization map for the starting-section at a non-low temperature, the target rotation speed R3 for the starting-section is set to a value (for example, 1500 rpm) higher than the target rotation speed R4 for the ending-section. Further, the acceleration control of the motor 12 is performed in the area in which the rotation speed of the motor 12 is equal to or lower than the target rotation speed R3, and the deceleration control of the motor 12 is performed in the area in which the rotation speed of the motor 12 is higher than the target rotation speed R3.

On the energization map for the ending-section at a non-low temperature, the target current I4 for the ending-section is set to a value (for example, 5.5 A) smaller than the target current I3 for the starting-section. The target current I4 for the ending-section at a non-low temperature is set to a value smaller than the target current I2 for the ending-section at a low temperature. Further, on the energization map for the ending-section at a non-low temperature, the target rotation speed R4 for the ending-section is set to a value (for example, 500 rpm) lower than the target rotation speed R3 for the starting-section. Further, the acceleration control of the motor 12 is performed in the area in which the rotation speed of the motor 12 is equal to or lower than the target rotation speed R4, and the deceleration control of the motor 12 is performed in the area in which the rotation speed of the motor 12 is higher than the target rotation speed R4.

Figure 4:
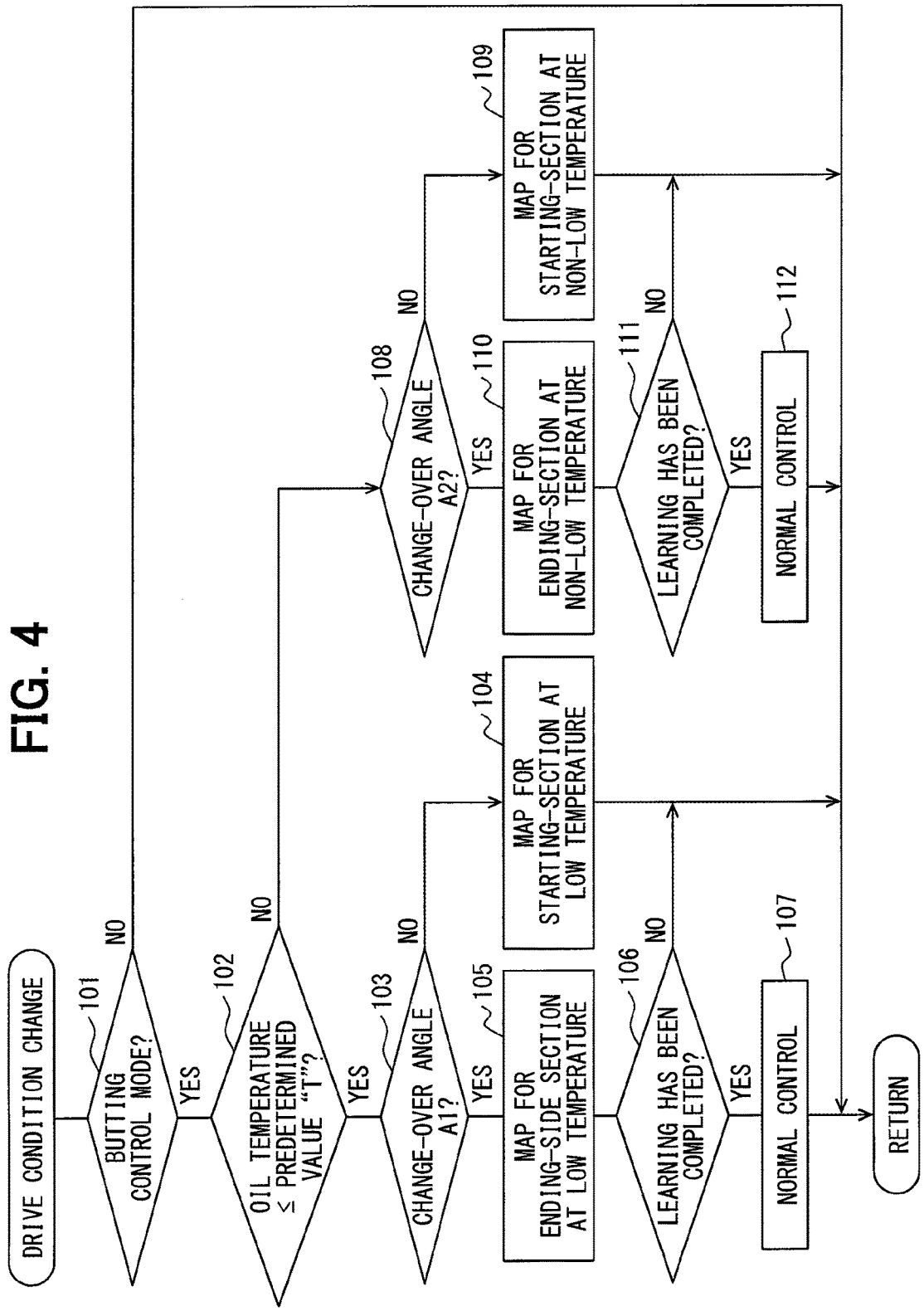
FIG. 4 is a flowchart showing a drive condition changing routine.

The drive condition changing routine shown in FIG. 4 is repeatedly executed by the microcomputer 41 at a predetermined period while the range-changing control circuit 42 is powered, and plays a role of a changing unit.

In step 101, it is determined whether a motor driving mode is a butting control mode. The butting control mode is a mode in which the butting control (for example, the P-range wall butting control or the D-range wall butting control) is performed to learn the reference position.

When it is determined in step 101 that the motor driving mode is not the butting control mode, the routine is ended without performing the process of step 102 and the proceeding steps.

On the other hand, when it is determined in above step 101 that the motor driving mode is the butting control mode, the process proceeds to step 102, and it is determined whether the oil temperature of the automatic transmission 27 (the temperature in correlation with the temperature of the range-changing mechanism 11) detected by the oil temperature sensor 33 is equal to or lower than a predetermined value "T". The predetermined value "T" is set, for example, at a temperature (for example, −20° C.) at which the viscosity of the lubricant on the range-changing mechanism 11 starts to increase so that the friction resistance affects more.

When it is determined in step 102 that the oil temperature is equal to or lower than the predetermined value T, it is determined that the temperature is low, and the process proceeds to step 103. In step 103, it is determined whether the rotation angle of the motor 12 from the start of the butting control has reached a change-over angle Al on the basis of, for example, whether the encoder count value has reached a changeover determination value corresponding to the change-over angle A1. The change-over angle A1 is set to an angle obtained by substituting a predetermined angle from a design value of the rotation angle of the motor 12 in the butting control. The change-over angle A1 may be a previously set constant value but may be changed depending on the oil temperature or the like.

When it is determined in step 103 that the rotation angle of the motor 12 has not reached the change-over angle A1, it is determined that the rotation angle of the motor 12 is in the starting-section, and the process proceeds to step 104. In step 104, the energization map for the starting-section at a low temperature represented by FIG. 5 is selected to control the energizing current of the motor 12 and the rotation speed. In this case, by performing control such that the energizing current of the motor 12 is increased to the target current I1 and is maintained in the vicinity of the target current I1, the torque of the motor 12 is increased to the target torque T1 and is maintained in the vicinity of the target torque T1. Further, a control is performed such that the rotation speed of the motor 12 is accelerated to the target rotation speed R1 and is maintained in the vicinity of the target rotation speed R1. By this operation, the torque of the motor 12 is made greater and the rotation speed is made higher in the starting-section than in the ending-section.

After that, when it is determined in above step 103 that the rotation angle of the motor 12 has reached the change-over angle A1, it is determined that the rotation angle of the motor 12 is in the ending-section, and the process proceeds to step 105. In step 105, the energization map for the ending-section at a low temperature represented by FIG. 5 is selected to control the energizing current of the motor 12 and the rotation speed. In this case, by performing control such that the energizing current of the motor 12 is reduced to the target current I2 and the energizing current of the motor 12 is maintained in the vicinity of the target current I2, the torque of the motor 12 is reduced to the target torque T2 and is maintained in the vicinity of the target torque T2. Further, a control is performed such that the rotation speed of the motor 12 is reduced to the target rotation speed R2 and is maintained in the vicinity of the target rotation speed R2. By this operation, the torque of the motor 12 is made smaller and the rotation speed is made lower in the ending-section than in the starting-section; and in this situation, the engagement part 23a of the detent spring 23 is butted against the limit position of the movable range of the range-changing mechanism 11.

Figure 7:
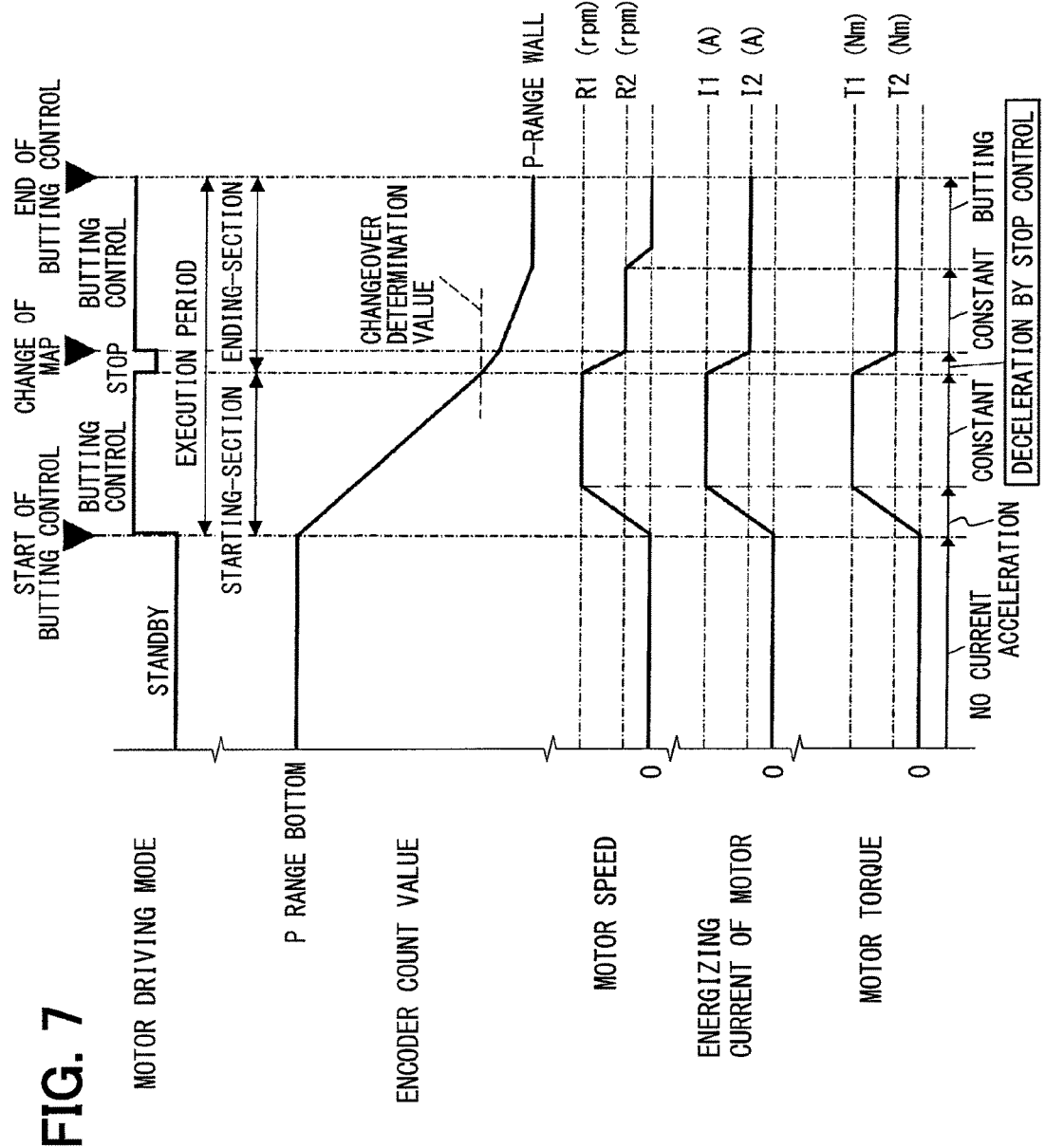
FIG. 7 is a time chart of a modified example of the driving condition changing process.

However, if it is impossible to quickly reduce the torque of the motor 12 and the rotation speed even when the map is changed to the energization map of the ending-section, a temporarily stop mode may be added, as shown in FIG. 7, before the map is changed to the energization map of the ending-section so as to quickly reduce the torque of the motor 12 and the rotation speed. This arrangement makes it possible to prevent the engagement part 23a of the detent spring 23 from butting the limit position before the torque of the motor 12 and the rotation speed are sufficiently reduced. The stop mode is a mode in which stop control is performed to quickly reduce the torque of the motor 12 and the rotation speed so as to stop the rotation of the motor 12. However, the stop mode is performed for such a short time that the motor 12 keeps rotating.

After that, the process proceeds to step 106, and it is determined whether the learning of the reference position is completed. At the moment when it is determined in step 106 that the learning of the reference position is completed, it is determined that the butting control is completed, and the process proceeds to step 107 and moves to a normal control. In the normal control, when the target range is changed, the energization phases of the motor 12 are sequentially changed to rotationally drive the motor 12 to the target rotational position corresponding to the target range on the basis of the encoder count value, so that the shift range is changed to the target range.

On the other hand, when it is determined in above step 102 that the oil temperature is higher than the predetermined value T, the temperature is determined to be not low, and the process proceeds to step 108. In step 108, it is determined whether the rotation angle of the motor 12 from the start of the butting control has reached a change-over angle A2 on the basis of, for example, whether the encoder count value has reached the changeover determination value corresponding to the change-over angle A2. The change-over angle A2 may be a previously set constant value but may be changed depending on the oil temperature or the like. Further, the change-over angle A2 at a non-low temperature may be set to the same value as the change-over angle A1 at a low temperature or may be set to a different value.

When it is determined in step 108 that the rotation angle of the motor 12 has not reached the change-over angle A2, it is determined that the rotation angle of the motor 12 is in the starting-section, the process proceeds to step 109. In step 109, the energization map for the starting-section at a non-low temperature represented by FIG. 6 is selected to control the energizing current of the motor 12 and the rotation speed. In this case, by performing a control such that the energizing current of the motor 12 is increased to the target current I3 and is maintained in the vicinity of the target current I3, the torque of the motor 12 is increased to the target torque T3 and is maintained in the vicinity of the target torque T3. Further, a control is performed such that the rotation speed of the motor 12 is accelerated to the target rotation speed R3 and is maintained in the vicinity of the target rotation speed R3. By this operation, the torque of the motor 12 is made greater and the rotation speed is made higher in the starting-section than in the ending-section.

After that, when it is determined in above step 108 that the rotation angle of the motor 12 has reached the change-over angle A2, it is determined that the rotation angle of the motor 12 is in the ending-section, and the process goes to step 110. In step 110, the energization map for the ending-section at a non-low temperature represented by FIG. 6 is selected to control the energizing current of the motor 12 and the rotation speed. In this case, by performing a control such that the energizing current of the motor 12 is reduced to the target current I4 and is maintained in the vicinity of the target current I4, the torque of the motor 12 is reduced to a target torque T4 and is maintained in the vicinity of the target torque T4. Further, a control is performed such that the rotation speed of the motor 12 is reduced to the target rotation speed R4 and is maintained in the vicinity of the target rotation speed R4. By this operation, the torque of the motor 12 is made smaller and the rotation speed is made lower in the ending-section than in the starting-section. In this situation, the engagement part 23a of the detent spring 23 is butted against the limit position of the movable range of the range-changing mechanism 11.

However, if it is impossible to quickly reduce the torque of the motor 12 and the rotation speed even when the map is changed to the energization map of the ending-section, a temporarily stop mode may be added before the map is changed to the energization map of the ending-section so as to quickly reduce the torque of the motor 12 and the rotation speed.

After that, the process proceeds to step 111, and it is determined whether the learning of the reference position has been completed. In step 111, at the moment when it is determined that the learning of the reference position has been completed, it is determined that the butting control has been completed, and the process proceeds to step 112 and moves to the normal control.

In the above-described present embodiment, the driving condition changing process is performed in the case that the butting control is performed at a low temperature at which the oil temperature of the automatic transmission 27 (the temperature in correlation with the temperature of the range-changing mechanism 11) is equal to or lower than the predetermined value. In this driving condition changing process, the torque of the motor 12 is made greater and the rotation speed is made higher in the starting-section of the butting control than in the ending-section, and the torque of the motor 12 is made smaller and the rotation speed is made lower in the ending-section than in the starting-section.

By this operation, the torque of the motor 12 can be made greater and the rotation speed can be made higher in the starting-section when the butting control is performed at a low temperature. Thus, the execution period of the butting control can be shorter than in the case that the torque of the motor 12 is made smaller and the rotation speed is made lower from the start to end of the butting control. After that, it is possible to make the torque of the motor 12 smaller and the rotation speed lower in the ending-section; therefore, the deformation amount of the component can be small when the engagement part 23a of the detent spring 23 is butted against the limit position of the movable range of the range-changing mechanism 11, whereby it is possible to learn the reference position accurately. By this operation, at a low temperature, it is possible to reduce the execution period of the butting control while securing the learning accuracy of the reference position.

Further, in the present embodiment, the driving condition changing process is performed also in the case that the butting control is performed at a non-low temperature at which the oil temperature of the automatic transmission 27 is higher than the predetermined value. By this operation, also at a non-low temperature, it is possible to reduce the execution period of the butting control while securing the learning accuracy of the reference position.

Further, in the present embodiment, the torque of the motor 12 is made greater in the case that the driving condition changing process is performed at a low temperature than in the case that the driving condition changing process is performed at a non-low temperature. The viscosity of lubricant on a movable part of the range-changing mechanism 11 is higher at a low temperature, and a friction resistance is thus increased. In order to address this issue, the torque of the motor 12 is made greater than at a non-low temperature so that it is possible to make the motor 12 rotate at an appropriate also at a low temperature.

Since the oil temperature of the automatic transmission 27 has a correlation with the temperature of the range-changing mechanism 11, the oil temperature of the automatic transmission 27 can be used as the information of the temperature of the range-changing mechanism 11. Focusing attention on this point, in the present embodiment, the oil temperature of the automatic transmission 27 detected by the oil temperature sensor 33 is used as the information of the temperature of the range-changing mechanism 11. With this arrangement, there is no need to add a new sensor for detecting the temperature of the range-changing mechanism 11, and this arrangement thus satisfies the need for cost reduction.

Note that, in the above embodiment, the range from the start to end of the butting control is divided into two sections. However, the present disclosure is not limited to the above embodiment, and the range may be divided into three or more sections. In this case, it is preferable that the motor torque is made greater and the rotation speed is made higher for a section which is closer to the starting side, in other words, it is preferable that the motor torque is made smaller and the rotation speed is made lower for a section which is closer to the ending side.

Further, in the above embodiment, the driving condition changing process is performed both at a low temperature and at a non-low temperature. However, the present disclosure is not limited to the above embodiment, and it is also possible that the driving condition changing process is performed only at a low temperature (the driving condition changing process is not performed at a non-low temperature).

Further, in the above embodiment, the oil temperature of the automatic transmission 27 detected by the oil temperature sensor 33 is used as the information of the temperature of the range-changing mechanism 11. However, the present disclosure is not limited to the above embodiment, and, for example, in the case that a temperature sensor is provided to detect the temperature (for example, the temperature of the winding wire) of the motor 12, the temperature of the motor 12 detected by the temperature sensor may be used as the information of the temperature of the range-changing mechanism 11. Alternatively, a temperature sensor may be provided to detect the temperature (for example, the temperature of a movable part) of the range-changing mechanism 11. Alternatively, the temperature of the range-changing mechanism 11 may be estimated based on at least one of an oil temperature, an outside air temperature, a cabin temperature, and the like.

Further, in the above embodiment, a part or an entire of the functions performed on the microcomputer 41 may be configured with hardware, for example, one or more ICs.

In the above embodiment, the present disclosure is applied to a system equipped with a range-changing mechanism in which a shift range is changed among four-ranges of P-range, R-range, N-range, and D-range. However, the present disclosure is not limited to the above embodiment, and, for example, the present disclosure may be applied to a system equipped with a range-changing mechanism in which a shift range is changed between the two ranges of P-range and Not-P-range. Alternatively, the present disclosure may be applied to a system equipped with a range-changing mechanism in which a shift range is changed among three ranges or five or more ranges.

Further, the present disclosure is applied to an automatic transmission (for example, AT, CVT, DCT, and the like) without limited thereto, and may be applied to a system equipped with a range-changing mechanism in which a shift range of a transmission (for example, a reducer) for an electric vehicle is changed.

In addition to the above, the present disclosure is not limited to the application to a range-changing mechanism but may be variously modified and practiced without departing from the spirit of the disclosure, for example, the present disclosure may be applied to a system equipped with a various position changing mechanisms whose driving source is a brushless synchronous motor such as an SR motor.

What is claimed is:

1. A motor controller comprising:
a motor that functions as a driving source for a control target;
an encoder that outputs a pulse signal in synchronism with rotation of the motor;
a controlling unit that rotationally drives the motor to a target position while sequentially changing energization phases of the motor, based on a count value of the output signal of the encoder, the controlling unit learning a reference position by executing a butting control in which the motor is made to rotate until butting a limit position of a movable range of the control target;
a temperature information obtaining unit that obtains a temperature, as temperature information, of the control target or obtains a temperature in correlation with the temperature of the control target; and
a changing unit that performs a driving condition changing process when the butting control is performed at a low temperature at which the temperature information is not greater than a predetermined value,
wherein:
an execution period from a starting of the butting control to an ending of the butting control is divided into a plurality of sections on a basis of a rotation angle of the motor;
in the driving condition changing process, a torque of the motor is made greater and a rotation speed is made higher in a starting-section of the plurality of sections than in an ending-section of the plurality of sections, and the torque of the motor is made smaller and the rotation speed is made lower in the ending-section than in the starting-section;
also when the butting control is performed at a non-low temperature at which the temperature information is greater than the predetermined value, the changing unit performs the driving condition changing process; and
the changing unit makes the motor torque greater in a case of performing the driving condition changing process at the low temperature than in a case of performing the driving condition changing process at the non-low temperature.

2. The motor controller according to claim 1, wherein the control target is a range-changing mechanism that changes a shift range of a transmission mounted on a vehicle.

3. The motor controller according to claim 2, wherein the temperature information obtaining unit is an oil temperature sensor that detects as the temperature information an oil temperature of the transmission.

* * * * *